United States Patent
Jafry et al.

(10) Patent No.: US 9,961,608 B2
(45) Date of Patent: May 1, 2018

(54) SEAMLESS CALL TRANSITIONS

(71) Applicants: Syed Mansoor Jafry, Kirkland, WA (US); Kerry D. Woolsey, Duvall, WA (US); Casey Dvorak, Seattle, WA (US); Tony He, Kirkland, WA (US); Peter Bergler, Duvall, WA (US)

(72) Inventors: Syed Mansoor Jafry, Kirkland, WA (US); Kerry D. Woolsey, Duvall, WA (US); Casey Dvorak, Seattle, WA (US); Tony He, Kirkland, WA (US); Peter Bergler, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 13/970,504

(22) Filed: Aug. 19, 2013

(65) Prior Publication Data

US 2015/0049867 A1 Feb. 19, 2015

(51) Int. Cl.
| | |
|---|---|
| *H04M 3/42* | (2006.01) |
| *H04W 36/36* | (2009.01) |
| *H04N 7/14* | (2006.01) |
| *H04W 4/00* | (2018.01) |
| *H04L 29/06* | (2006.01) |
| *H04W 4/16* | (2009.01) |

(52) U.S. Cl.
CPC ....... *H04W 36/365* (2013.01); *H04L 65/1083* (2013.01); *H04M 3/42161* (2013.01); *H04N 7/147* (2013.01); *H04W 4/001* (2013.01); *H04W 4/16* (2013.01)

(58) Field of Classification Search
CPC .... H04M 3/436; H04M 3/42; H04M 3/42059; H04M 3/56; H04M 3/568; H04M 3/563; H04M 7/006; H04W 4/16; H04W 4/06; H04W 4/08; H04L 65/1069; H04L 65/1006
USPC ..................... 379/201.01; 455/416; 370/352
See application file for complete search history.

(56) References Cited

U.S. PATENT DOCUMENTS

| | | |
|---|---|---|
| 5,596,628 A | 1/1997 | Klein |
| 5,710,806 A | 1/1998 | Lee |
| (Continued) | | |

FOREIGN PATENT DOCUMENTS

| | | |
|---|---|---|
| EP | 0583094 | 2/1994 |
| EP | 1439681 | 7/2004 |
| (Continued) | | |

OTHER PUBLICATIONS

"FaceTime," Apple.com/ios/facetime/, visited Apr. 23, 2013, 3 pages.

(Continued)

*Primary Examiner* — Rasha Al Aubaidi
(74) *Attorney, Agent, or Firm* — Klarquist Sparkman, LLP

(57) ABSTRACT

Various user interfaces and other technologies for seamlessly transitioning between calls of different types can be implemented. The technologies can be implemented to give the impression of a single call that is upgraded from one call type to another. A new application can register so that an appropriate user interface control appears for activation when seamless call transition is possible. Transitioning for third party applications can thus be supported. Cross-platform implementations can be supported.

19 Claims, 12 Drawing Sheets

(56) References Cited

U.S. PATENT DOCUMENTS

| | | | |
|---|---|---|---|
| 5,894,512 A | 4/1999 | Zenner | |
| 6,975,622 B2* | 12/2005 | Korycki | H04L 12/66 370/260 |
| 6,988,132 B2 | 1/2006 | Horvitz | |
| 7,653,715 B2 | 1/2010 | Bobde et al. | |
| 7,778,402 B1 | 8/2010 | Croak et al. | |
| 7,852,783 B2 | 12/2010 | Tasker et al. | |
| 8,041,020 B2 | 10/2011 | Drewry et al. | |
| 8,111,686 B2 | 2/2012 | Chavda et al. | |
| 8,223,189 B2 | 7/2012 | Meyere et al. | |
| 8,576,995 B1 | 11/2013 | Marghescu et al. | |
| 8,744,420 B2* | 6/2014 | Cranfill et al. | 455/416 |
| 8,942,674 B2 | 1/2015 | Kumar et al. | |
| 9,681,095 B2 | 6/2017 | Krishnamoorthy et al. | |
| 2005/0180338 A1 | 8/2005 | Pririla et al. | |
| 2007/0143397 A1 | 6/2007 | Guedalia et al. | |
| 2007/0263605 A1 | 11/2007 | Estevez et al. | |
| 2007/0273749 A1 | 11/2007 | Fujii et al. | |
| 2008/0056235 A1 | 3/2008 | Albine et al. | |
| 2008/0215591 A1 | 9/2008 | Howard et al. | |
| 2008/0317010 A1 | 12/2008 | Naqvi et al. | |
| 2009/0028063 A1 | 1/2009 | Chang | |
| 2009/0070701 A1 | 3/2009 | Dingle et al. | |
| 2010/0080212 A1 | 4/2010 | Krstulich | |
| 2010/0083113 A1 | 4/2010 | Weaver et al. | |
| 2010/0199320 A1* | 8/2010 | Ramanathan | H04N 7/147 725/109 |
| 2011/0164107 A1 | 7/2011 | Tian et al. | |
| 2011/0194678 A1 | 8/2011 | Lewis et al. | |
| 2011/0207447 A1* | 8/2011 | Bhow | H04M 1/2535 455/417 |
| 2011/0249073 A1 | 10/2011 | Cranfill et al. | |
| 2011/0249079 A1* | 10/2011 | Santamaria et al. | 348/14.02 |
| 2011/0273526 A1 | 11/2011 | Mehin et al. | |
| 2011/0275358 A1* | 11/2011 | Faenger | G06F 9/4856 455/420 |
| 2011/0306325 A1 | 12/2011 | Gutta et al. | |
| 2012/0062688 A1 | 3/2012 | Shen et al. | |
| 2012/0066596 A1 | 3/2012 | Feng et al. | |
| 2012/0225652 A1* | 9/2012 | Martinez | H04M 3/42374 455/435.1 |
| 2013/0111365 A1 | 5/2013 | Chen et al. | |
| 2013/0238729 A1 | 9/2013 | Holzman et al. | |
| 2013/0293664 A1 | 11/2013 | Tsang et al. | |
| 2013/0335519 A1 | 12/2013 | Greenslade et al. | |
| 2014/0003597 A1 | 1/2014 | Lazaridis et al. | |
| 2014/0254785 A1* | 9/2014 | Ezell | H04M 3/42127 379/211.02 |
| 2014/0302830 A1 | 10/2014 | Yang et al. | |
| 2015/0029901 A1 | 1/2015 | Patel et al. | |
| 2015/0078538 A1 | 1/2015 | Jain | |
| 2015/0049157 A1 | 2/2015 | Krishnamoorthy et al. | |
| 2015/0049158 A1 | 2/2015 | Olatunji et al. | |
| 2015/0049164 A1 | 2/2015 | Krishnamoorthy et al. | |
| 2017/0272695 A1 | 9/2017 | Krishnamorrthy et al. | |
| 2018/0049160 A1 | 2/2018 | Hong et al. | |

FOREIGN PATENT DOCUMENTS

| | | |
|---|---|---|
| EP | 2120440 | 11/2009 |
| EP | 2493166 | 8/2012 |
| EP | 2611255 | 7/2013 |
| EP | 2625848 | 8/2013 |
| WO | WO 2006/052176 | 5/2006 |
| WO | WO 2006/121272 | 11/2006 |
| WO | WO 2006/137646 | 12/2006 |
| WO | WO 2009/081334 | 7/2009 |
| WO | WO 2012047901 | 4/2012 |

OTHER PUBLICATIONS

"FaceTime," Wikipedia, visited Jul. 29, 2013, 5 pages.
Frost, Laurence. "Nokia, Motorola show cellular—VoIP phones," USAToday.com, visited Apr. 23, 2013, 2 pages.
"Generic Access Network," Wikipedia, visited Apr. 24, 2013, 7 pages.
"Mobile Operators plan to make Instant Messaging, Live Video Sharing, and File Transfer as Easy on the Mobile as Calling and Text," wirelessfederation.com/news/, visited Jul. 29, 2013, 5 pages.
"Nokia 6301 hits on UMA," gsmarena.com, visited Apr. 23, 2013, 2 pages.
"Rich Communication Services," Wikipedia, visited Jul. 29, 2013, 6 pages.
"Tango (application)," Wikipedia, visited Jul. 15, 2013, 3 pages.
Unuth, Nadeem. "UMA Explained: What is UMA?" About.com, visited Apr. 23, 2013, 1 page.
"Viber," Wikipedia, visited Jul. 15, 2013, 3 pages.
$3^{rd}$ Generation Partnership Project; Technical Specification Group Services and System Aspects; IP Multimedia Subsystem (IMS) centralized services; Stage 2 (Release 12), 3GPP TS23.292, V12.2.1, Jun. 2013, 120 pages.
Written Opinion issued in corresponding PCT Patent Application No. PCT/US2014/051394, dated Jun. 29, 2015, 6 pages.
Second Written Opinion issued in PCT Application No. PCT/US2014/051392, corresponding to U.S. Appl. No. 14/231,208, dated Aug. 7, 2015, 6 pages.
Second Written Opinion issued in PCT Application No. 2014/051393, corresponding to U.S. Appl. No. 14/231,249, dated Aug. 10, 2015, 6 pages.
Second Written Opinion issued in PCT Application No. PCT/US2014/051391, corresponding to U.S. Appl. No. 14/231,167, dated Aug. 10, 2015, 6 pages.
3rd Generation Partnership Project; Technical Specification Group Services and System Aspects; IP Multimedia Subsystem (IMS) Service Continuity; Stage 2 (Release 12) 3GPP Standard: TS23.228, Stage 2(3 GPP TS 23.228 version 1.9.0 Release 12) retrieved on Mar. 5, 2013, pp. 1-290.
3rd Generation Partnership Project; Technical Specification Group Services and System Aspects; IP Multimedia Subsystem (IMS) Service Continuity; Stage 2 (Release 11), 3GPP TS 23.237, version 11.5.0, Published on: Jun. 2012, pp. 1-169.
International Preliminary Report on Patentability, received in counterpart PCT Application No. PCT/US2014/051394, dated Oct. 2, 2015, 7 pages.
International Preliminary Report on Patentability, received in PCT Application No. PCT/2014/051393, counterpart to grandchild U.S. Appl. No. 14/231,249, dated Nov. 3, 2015, 7 pages.
International Preliminary Report on Patentability, received in PCT Application No. PCT/US2014/051392, counterpart to grandchild U.S. Appl. No. 14/231,208, dated Nov. 3, 2015, 7 pages.
International Preliminary Report on Patentability, received in PCT Application No. PCT/US2014/051391, counterpart to grandchild U.S. Appl. No. 14/231,167, dated Oct. 29, 2015, 7 pages.
Trautschold et al., iPhone 4 Made Simple, Chapter 12, "FaceTime Video Messaging and Skype," Apress, Springer Science+Business Media, 2010, 27 pages.
Examination Report received in a counterpart Australian Application No. 2014309155, dated Oct. 11, 2017, 3 pages.
U.S. Appl. No. 14/201,547, filed Mar. 7, 2014, Olatunji et al.
U.S. Appl. No. 14/231,167, filed Mar. 31, 2014, Krishnamoorthy et al.
U.S. Appl. No. 14/231,208, filed Mar. 31, 2014, Krishnamoorthy et al.
U.S. Appl. No. 14/231,249, filed Mar. 31, 2014, Krishnamoorthy et al.
"Vtok—Free Calls, Texts, Chat, Video for Google Talk and Voice," Jun. 24, 2013, available at https://itunes.apple.com/in/app/vtok-free-calls-texts-chat/id421102042?mt=8, 3 pages.
"Bria—VoIP SIP Phone with Video and Messaging," Jul. 12, 2013, available at: https://itunes.apple.com/us/app/bria-voip-sip-phone-video/id373968636?mt=8, 2 pages.
"Cisco Jabber Video," Feb. 11, 2012, available at: http://www.ivci.com/cisco-jabber-video-for-telepresence.html#page=page-1, 2 pages.

(56) References Cited

OTHER PUBLICATIONS

Piltch, "How to Change Default Apps in Android," Mar. 12, 2013, available at: http://blog.laptopmag.com/how-to-change-default-apps-in-android, 8 pages.

Barnard, "VoIP Phone System Maker ShoreTel Releases ShoreTel 7, Adds New Switches and Conference Phone," http://technews.tmcnet.com/hosted-voip/feature/articles/6390-voip-phone-system-maker-shoretel-releases-shoretel7.htm, Apr. 23, 2007, 3 pages.

"Google Talk Call Signaling," https://developers.google.com/talk/call_signaling#Detecting_support_and_call_routing, Nov. 1, 2012, 10 pages.

"Lync Product Guide," http://download.microsoft.com/downlaod/1/2/2/12233C7C-A549-4663-A339-D55379B658A1/Lync%20Product%20Guide.pdf, Nov. 2012, 30 pages.

Baset et al., "An Analysis of the Skype Peer-to-Peer Internet Telephony Protocol," in Technical Report CUCS-039-04, Sep. 15, 2004, 12 pages.

"Voice and Video Calling over LTE," http://www.ericsson.com/res/docs/whitepapers/WP-Voice_video_calling_LTE.pdf, Feb. 2012, 18 pages.

"Call Escalation from Voice to Video," http://www.cisco.com/en/US?docs/ios-xml/ios/voice/cube_sipsip/configuration/ex-3s/voi_callesc_voice2vid.pdf, retrieved Aug. 16, 2013, 4 pages.

"LG Paving the Way with Mobile Technologies," http://www.lg.com/in/innovation/technology/lg-lte-tech, retrieved Aug. 16, 2013, 2 pages.

Blandford, "Viber for Windows Phone 8 updated with VoIP support," http://allaboutwindowsphone.com/flow/ite/17188_Viber_for_Windows_Phone_8_u pda.php, Apr. 2, 2013, 10 pages.

Telephone Systems—From PSTN to VOIP, http://www.numberstore.com/Telephone-Systems-From-PSTN-to-VOIP.html, Dec. 3, 2011, 2 pages.

Mombrea, "Use your cell phone as a WiFi VOIP phone," http://www.itworld.com/consumerization-it/372436/use-your-cell-phone-wifi-voip-phone, Sep. 11, 2013, 5 pages.

Skype Gateways, http://www.voip-info.org/wiki/view/Skype+Gateways, Oct. 11, 2006, 10 pages.

Donnell, "LG Demonstrates Seamless Voice-To-Video Call Switching at MWC," http://www.talkandroid.com/95307-lg-demonstrates-seamless-voice-to-video-call-switching-at-mwc/, Feb. 28, 2012, 10 pages.

International Search Report and Written Opinion issued in PCT Application No. PCT/US2014/051391, dated Dec. 17, 2014, 10 pages.

International Search Report and Written Opinion issued in PCT Application No. PCT/US2014/051393, dated Dec. 17, 2014, 10 pages.

Katell Henry et al., "Rich Communication Suite," Intelligence in Next Generation Networks, 2009, ICIN 2009, 13th International Conference on, IEEE, Piscataway, NJ, Oct. 26, 2009, pp. 1-6.

International Search Report and Written Opinion issued in PCT Application No. PCT/US2014/0513952, dated Dec. 17, 2014, 13 pages.

International Search Report and Written Opinion issued in PCT Application No. PCT/US201/051394, dated Dec. 17, 2014, 10 pages.

* cited by examiner

| REGISTERED VIDEO APPS | |
|---|---|
| APP | PREFERRED |
| APPLICATION 1 | |
| APPLICATION 2 | |
| APPLICATION 3 | Y |

SEAMLESS CALL TRANSITIONS

BACKGROUND

Mobile phones now have functionality and applications that provide a wide variety of communication modes. For example, a single device can now support conventional phone calls, Voice-over-Internet-Protocol (VoIP) calls, video calls, and the like. However, such functionality has not been particularly well integrated, and new users may not even be aware that such functionality is available to them.

Because users can face hurdles when attempting to take advantage of different communication modes, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The technologies can include a method implemented at least in part by a communication device, the method comprising: while conducting a first call of a first call type with the communication device, determining whether it is possible to seamlessly transition to a second call of a second call type, wherein determining whether it is possible to seamlessly transition comprises confirming whether a communication application of the second call type is available at the communication device; responsive to determining that it is possible to seamlessly transition, presenting a user interface option to seamlessly transition; and responsive to activation of the user interface option, seamlessly transitioning to the second call of the second call type.

The technologies can include a communication device comprising: one or more processors; memory storing an executable audio calling application, an executable video calling application, and application registration information indicative of whether the executable video calling application supports seamless transitions; and a call controller configured to seamlessly transition a call from the audio calling application to the video calling application.

The technologies can include one or more computer-readable storage media having encoded thereon computer-executable instructions causing a computing system to perform a method comprising: during an audio call with a remote device, determining whether network conditions support a video call, confirming that a communication application supporting seamless transitions to a video call is registered at a local communication device, and verifying that the remote device supports a video call from a video calling application; responsive to determining that network condition will support the video call that a communication application supporting seamless transitions to a video call is registered at the local communication device, and that the remote device supports video calling with a video calling application, initiating the video call with the remote device via the video calling application; suppressing audio for the video call; responsive to verifying connectivity of the video call, seamlessly transitioning the audio call to the video call, wherein seamlessly transitioning comprises: i) unsuppressing audio of the video call; ii) displaying video of the video call; and ii) dropping the audio call.

As described herein, a variety of other features and advantages can be incorporated into the technologies as desired.

BRIEF DESCRIPTION OF THE DRAWINGS

FIG. 8 is a block diagram of a table storing a preferred communication application.

DETAILED DESCRIPTION

EXAMPLE 1

Exemplary Overview

The technologies described herein can be used for a variety of seamless call transition scenarios, and adoption of the technologies can provide improved techniques for communicating via different call types. The user interfaces can better facilitate seamless call transitions. Other features described herein can be implemented to customize the call experience to user preferences. An overall superior user experience with smoother transitions between call types can result.

Further, the technologies can support a variety of communication applications and implement cross-platform seamless call transitions.

Various other features can be implemented and combined as described herein.

EXAMPLE 2

Exemplary System Implementing Seamless Call Transitions

Figure 1:
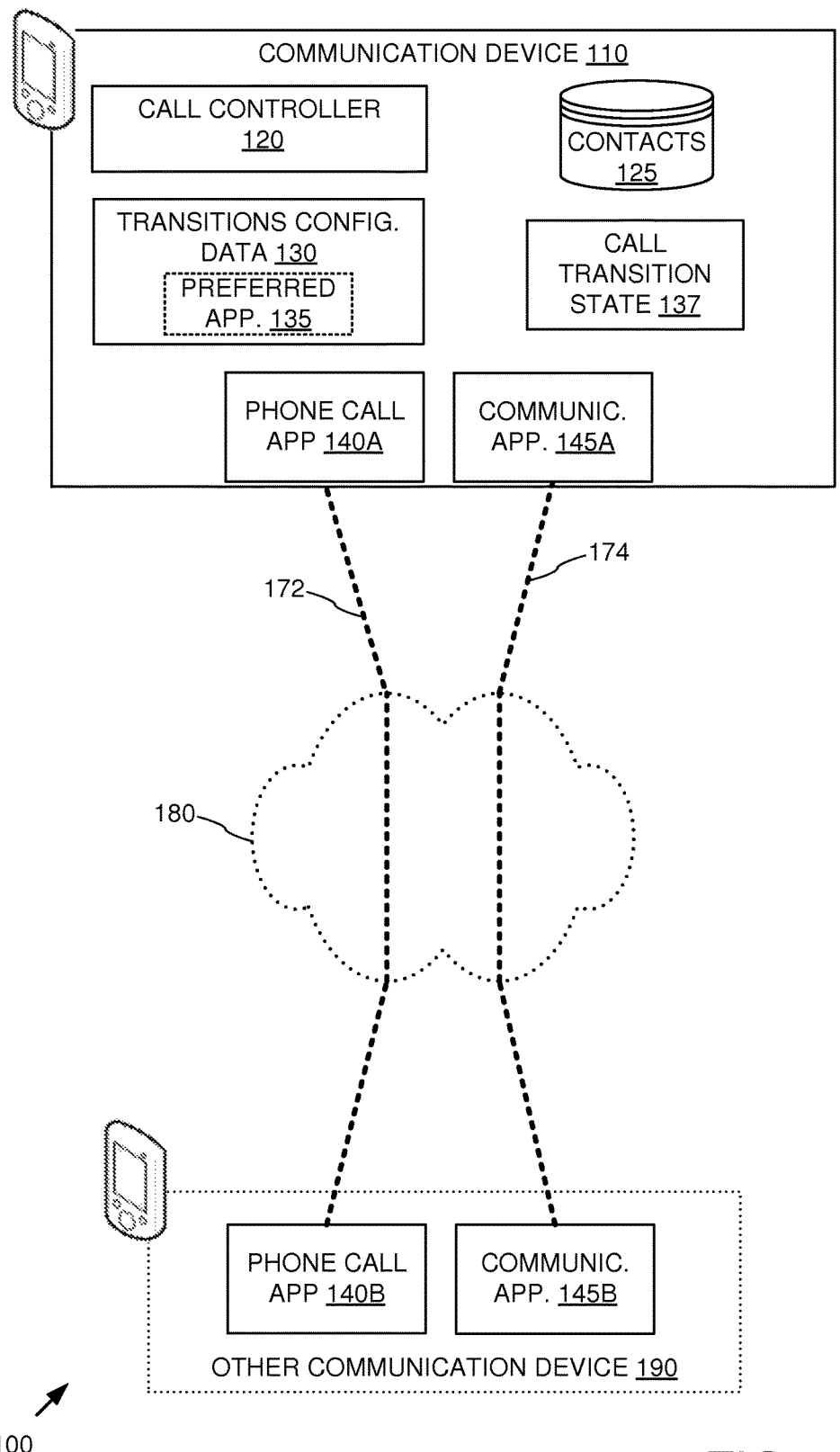
FIG. 1 is a block diagram of an exemplary system implementing seamless call transitions.

FIG. 1 is a block diagram of an exemplary system 100 implementing seamless call transitions as described herein.

For purposes of context, FIG. 1 shows that the communication device 110 is engaged in communication with another (e.g., remote) communication device 190 via one or more networks 180.

In the example, a communication device 110 includes a call controller 120 and a contact database 125. Transitions configuration data 130 can include a preferred application for use with a particular call type. A call transition state 137 can track the state of call transition as described herein.

The communication device 110 can support two simultaneous calls 172, 174 of different call types with another communication device 190. As shown, the calls can be hosted by two different applications, a phone call application 140A in communication with its counterpart 140B and another (e.g., non-phone call) communication application 145A in communication with its counterpart 145B. The different applications 140A, 145B can be of different application types. As described herein, cross-platform operation can be supported. The calls can pass through one or more networks 180. For example, the calls 172, 174 can be made over the same or different networks 180. The calls can pass through different physical or logical communication channels.

As described herein, a transition between the two calls 172, 174 can be performed seamlessly to give the impression that a single call is involved (e.g., the call or communication are not interrupted). Various techniques, such as initiating the second call in the background, maintaining the first call, suppressing audio of the second call, inhibiting portraying the second call as a second call, and ultimately transitioning to the second call can be applied to implement seamless call transitions.

Although various components are shown in separate boxes, in practice, component boundaries may vary. For example, the components can be provided as part of a phone operating system, call controller, or the like. Other arrangements are possible while still implementing the technologies.

In practice, the systems shown herein, such as system 100, can be more complicated, with additional functionality, more communication apps, and the like.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, and applications can be stored in one or more computer-readable storage media or computer-readable storage devices. The technologies described herein can be generic to the specifics of operating systems or hardware and can be applied in any variety of environments to take advantage of the described features.

EXAMPLE 3

Exemplary Method Implementing Seamless Call Transitions

Figure 2:
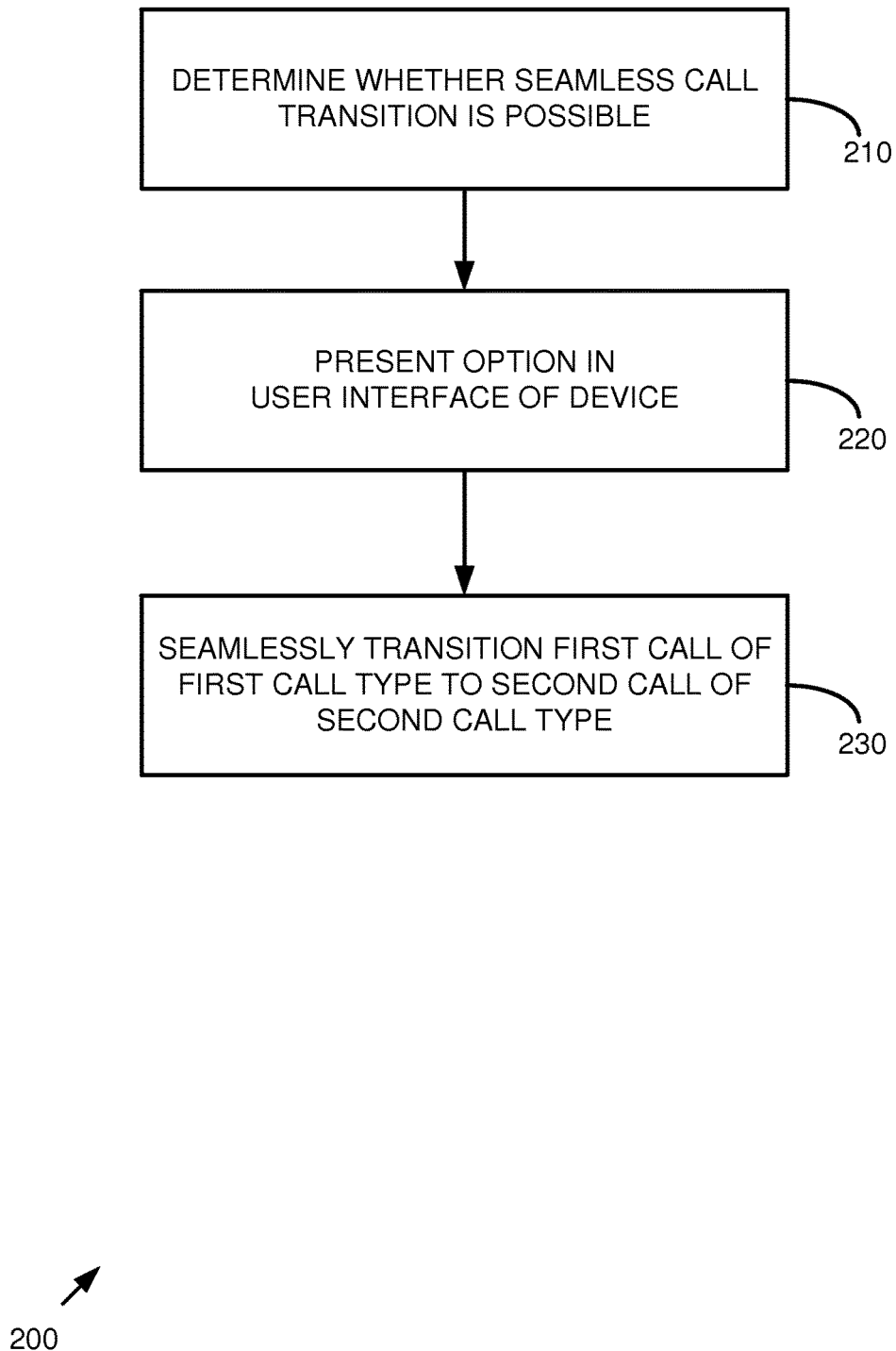
FIG. 2 is a flowchart of an exemplary method of implementing seamless call transitions.

FIG. 2 is a flowchart of an exemplary method 200 of implementing seamless call transitions and can be implemented, for example, in the system shown in FIG. 1.

The method 200 is typically performed after a first call (e.g., with a phone call application) has already been established. In practice, a call progress user interface is displayed while conducting the first call.

At 210, it is determined whether seamless call transition to a second call of a second call type (e.g., different from the first call) is possible. Such a determination can be made while conducting the first call of the first call type. As described herein, such a determination can be based on capabilities of the other communication device, network conditions, and the like. At this point, the second call need not be established.

At 220, responsive to determining that seamless call transition is possible, an option is presented in a user interface of the communication device to initiate seamless call transition. As described herein, such an option can take the form of a graphical button that is enabled upon determination that seamless call transition is possible. The option can be presented as part of a call progress user interface (e.g., while conducting the first call).

Although not shown, the method can include obtaining consent from the other communication device as described herein.

At 230, responsive to activation of the user interface option, the first call of the first call type is seamlessly transitioned to a second call of the second call type. The second call can be established (e.g., as part of the transition process or beforehand) while maintaining the first call. Thus, to a user of the communication device, the two calls appear to be as one (e.g., uninterrupted) call. A typical scenario is transitioning a phone call to a VoIP call (e.g., with or without video), but other transitions are possible as described herein.

During seamless transitioning, two calls can be simultaneously maintained with the same (e.g., other) communication device.

A variety of techniques can be used during seamless transitioning. For example, the second call can be initiated, the audio suppressed, and connectivity confirmed. Subsequently, the audio can be unsuppressed, and the first call can be dropped.

Upon transition to the second call, any features available to a call of the second type can be made available. As described herein, such features can include video, screen sharing, or other functionality provided by the communication application orchestrating the second call. Accordingly, the user interface can be upgraded to provide or indicate such features.

A typical use case for the method 200 is to transition a call from a phone call over a conventional (e.g., circuit switched, cellular, or the like) phone call to a Voice-over-Internet-Protocol (VoIP) call. VoIP calls can support video and other features as desired. However, the technologies can support transitions between other call types, or transitions in the other direction.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

EXAMPLE 4

Exemplary Communication Device Implementing Seamless Call Transitions

Figure 3:
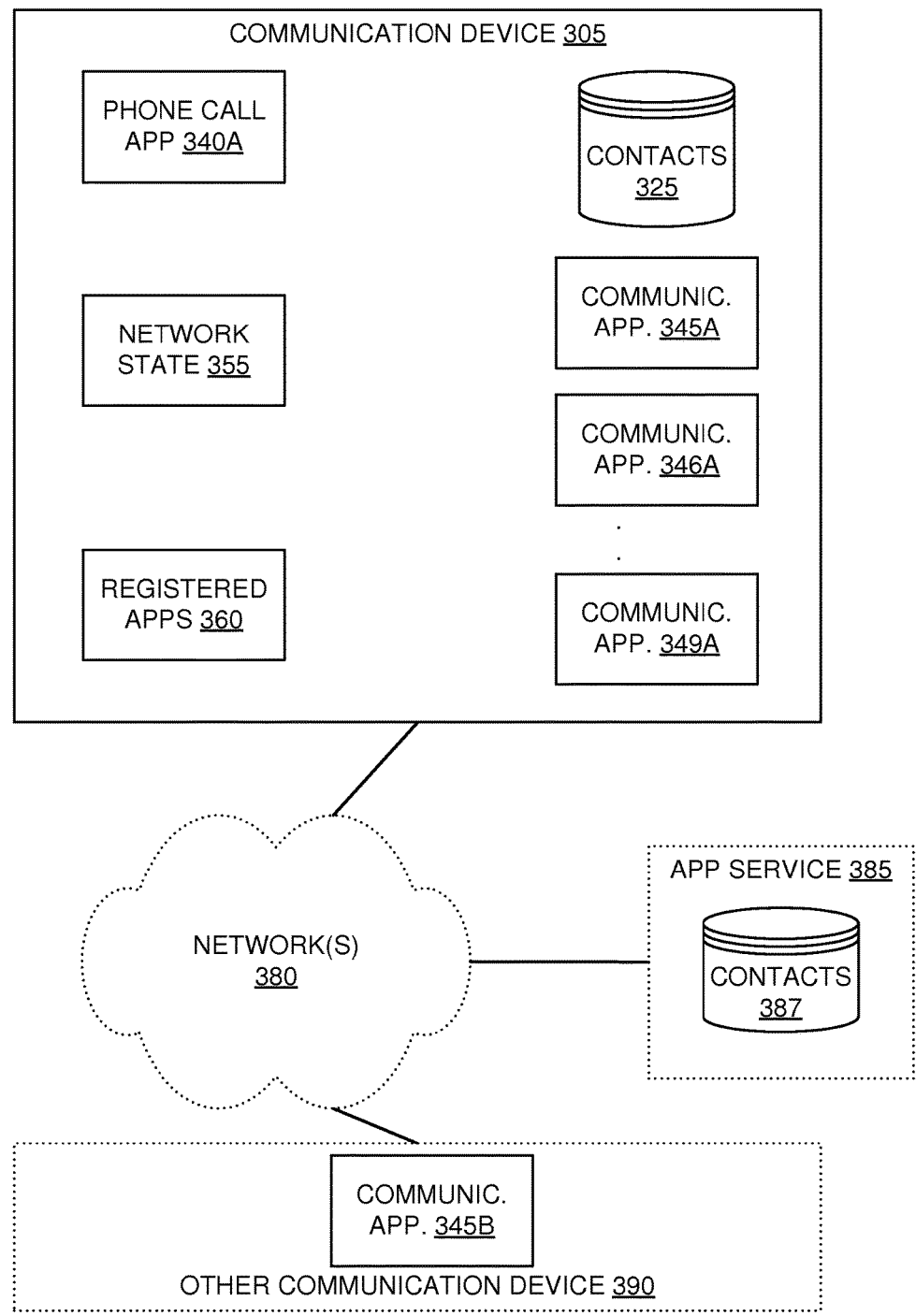
FIG. 3 is a block diagram of an exemplary system configured to determine whether seamless call transitions are possible.

FIG. 3 is a block diagram showing an exemplary system 300 configured to determine whether seamless call transitions are possible. In the example, a communication device 305 (e.g., communication device 110 of FIG. 1) comprises a phone call app 340A, one or more communication applications 345A-349A, a contacts data base 325, and network state indicator 355.

A variety of techniques can be used to determine whether a seamless call transition is possible. In some cases, a variety of different call types may be supported, and the determination can be made individually for the different call types (e.g., a seamless transition to a video call may not be possible, but a seamless transition to VoIP without video may be possible).

As described herein, a determination of whether a seamless call transition to a particular call type is possible can depend on the network state indicator 355, which indicates whether conditions on the network 380 will support the call type. A check against the application registration information 360 can also be performed to determine whether an application that supports seamless transitions is registered. Different apps can be registered for different call types as described herein. The information 360 can indicate whether a particular application supports seamless transitions (e.g., by call type).

The determination can also depend on the capabilities of the other communication device 390. One technique for determining the capabilities of the other communication device 390 is to store information locally (e.g., associated with the contacts database 325). For example, if a device is known to have video capabilities, an entry in the database (e.g., based on phone number or other address) can be annotated to indicate that the device has video capabilities. The communication device 305 can periodically update the local store by communicating with the application service 385 (e.g., to determine if contacts in the contacts database 387 match those in the local database 325).

However, a user may have multiple devices that use the same address or username for a particular communication service. Accordingly, capabilities can be determined by communicating with a counterpart communication application 345B on the other communication device 390. Or, an application service 385 may actively update the status of tracked devices (e.g., whether they are connected, what version of software they have, etc.).

In some cases, no communication applications 345A-349A are present. Or, no communication applications of a particular type may be present. In such a case, although a seamless call transition is not immediately possible, an option in the current user interface can be presented by which an appropriate communication application can be obtained as described herein. Consequently, seamless transition may then be possible. Thus, users can be helpfully informed that transition functionality is a possibility on their device.

Similarly, if an application is present but not configured or activated, an option in the current user interface can be presented by which the communication application can be configured or activated. Again, users can be helpfully informed that transition functionality is a possibility on their device.

EXAMPLE 5

Exemplary Method Implementing Seamless Call Transitions

Figure 4:
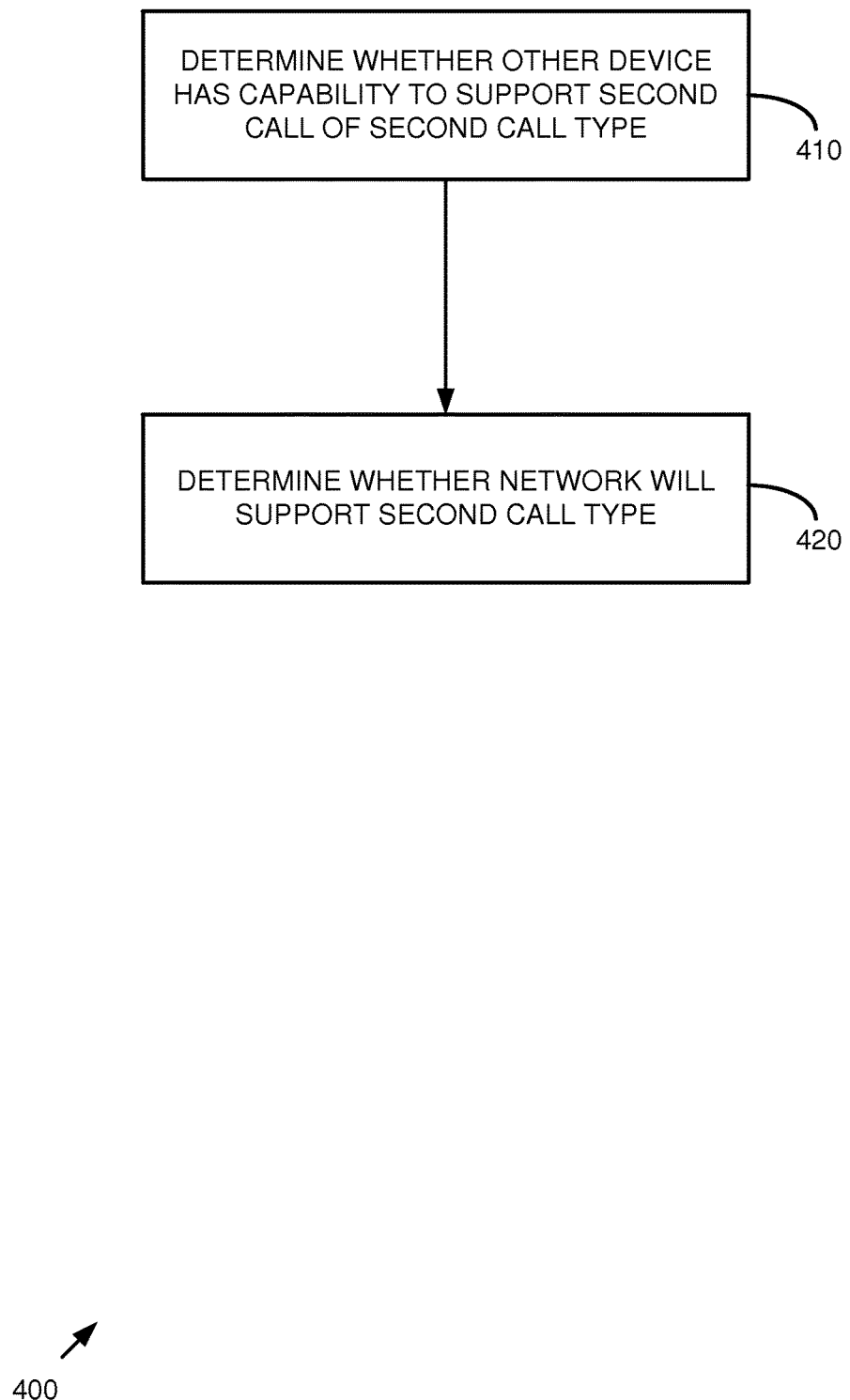
FIG. 4 is a flowchart of an exemplary method of determining whether seamless call transitions are possible.

FIG. 4 is a flowchart of an exemplary method 400 of determining whether seamless call transitions are possible and can be implemented, for example, in the system shown in FIG. 3. Although other arrangements are possible, in practice, the method 400 is typically invoked during communications with another device via a call of a first call type. The method can be implemented to preserve the seamless nature of the call transition. For example, a simple user interface option can be presented during a call when a seamless transition is possible instead of requiring navigation to a special or separate user interface.

In any of the examples herein, (e.g., before the method 400 commences, during the method 400, or the like) it can be determined whether a communication application of the second call type is available (e.g., installed, registered, configured to be active, or the like) at the local communication device. As described herein, if multiple communication applications supporting a particular call type are available, a favorite or preferred application can be stored for the call type. The preferred application can then be used throughout the seamless transition process. The determination can also include determining whether the application supports seamless transitions (e.g., to a particular call type).

If a communication application of the second call type is not available, an option can be displayed in the current user interface as described herein to obtain the application, activate it, configure it, or the like. Otherwise, responsive to determining that a communication application of the second call type is available, the method can continue. Thus, it is confirmed whether a communication application of the second call type is available at the local communication device.

At 410, it is determined whether the other communication device supports a second call of the second call type. As described herein, such a determination can be made in a variety of ways.

Determining whether the other device supports calls can be accomplished by querying local information about the other communication device. For example, a local contacts database (e.g., address book) can be checked to see if the other communication device (e.g., the number of which can be found via caller id or was dialed) or a user associated with the other communication device (e.g., the user is stored in local contacts as associated with the number of the current call) has an account with a service provider supporting calls of the second call type. If so, it can be assumed that the other device supports such calls. The address book can be enhanced or supplemented to indicate whether seamless transitions are possible. Information such as a platform type, platform version, application type, application version, and the like can be stored, consulted, or both to determine whether the other device can implement seamless transitions.

Other techniques include checking directly with (e.g., querying) the other communication device. Such a check can be made by handshaking between a local app and the remote app (e.g., or background versions of the app) that supports calls of the second call type. For example, if a preferred app is indicated for a particular call type, a query can be made to see if the other device has an instance or background listener in place of the app. Or, the call controller or other software can store such information to avoid having to invoke the applications.

Another technique is to query an application service (e.g., a server associated with the communication application supporting the second call type) to see if a number or contact (e.g., associated with the other device) is recognized. Recognition can include whether the number or contact is registered, active, or both.

To facilitate the determination, an application programming interface call can be defined for communication applications by which a local communication application can be queried to provide an answer concerning whether the other device has appropriate capabilities. Inputs can include a call type, a user identifier (e.g., number, address, or the like), or both.

At 420, it is determined whether a current network is able to support a call of the second call type. For example, if connectivity to certain types of networks is unavailable or unstable, the call type may not be possible. The communication device can store one or more network state indicators or network connectivity condition indicators to indicate the status of respective networks. Such networks can include wireless data connections provided by mobile operators (e.g., 3G, 4G, 4G LTE, WiMAX, or the like), Wi-Fi connections, or the like. Different status indicators can be stored for different networks. Thus, determining whether it is possible to seamlessly transition can comprise determining whether a network connectivity condition indicator indicates that the second call type is possible.

If both of the determinations indicate that a seamless transition to a call of the second call type is possible (e.g., the other device has the capability and the network will support the second call type), then an option for initiating the transition can be provided as described herein. Other conditions can be incorporated into the determination.

EXAMPLE 6

Exemplary Call Types

In any of the examples herein, the technologies can support a plurality of different call types. One call type that is nearly ubiquitous in contemporary communication devices is the standard (mobile) phone call (e.g., switched or managed via a mobile operator infrastructure), that is sometimes called a "cellular call," even though the underlying technology may not be cellular. Other call types include VoIP calls, which in some implementations can be further divided into voice-only VoIP calls, video VoIP calls, and the like. RCS or RCS-e call types can also be supported.

The technologies can support a variety of ways of designating call types. For example, calls orchestrated by different communication applications that share certain characteristics can be considered to be the same call type (e.g., Skype calls and Viber calls are considered to be of the video call type). Or, such calls can be implemented as different call types (e.g., one call type for a Skype call and another call type for a Viber call).

In practice, different call types can be accomplished through different channels or over different networks. However, some or all legs can share the same network infrastructure.

EXAMPLE 7

Exemplary Communication Application Types

In addition to a communication application ("app") that supports standard phone calls, in any of the examples herein, a wide variety of other communication application types (e.g., non-phone call apps) can be supported on a single device. In practice, such communication applications can be provided by different (e.g., third-) parties (e.g., provided and maintained by an entity other than the entity that provides and maintains the software for the phone operating system, call controller, the phone call app, or the like). Exemplary application types that can be supported include video applications, VoIP application (e.g., that can support video), and the like.

In practice, such application types can be associated with service providers who originate the software for achieving communications and maintain servers that facilitate connections or other functionality. For example, the Skype™ application provided by Microsoft Corporation, the Viber application provided by Viber Media Inc., the Tango™ application provided by TangoME, Inc., and others are available applications that can be supported. Various RCS and RCS-e applications provided by mobile operators can also be supported.

Further, within a particular service, there may be different actual applications for different platforms or versions of hardware. For example, a Skype™ application may be implemented on a variety of operating systems. Thus, a single service provider can originate communication applications to be implemented across different platforms (e.g., operating systems). For example, a Skype™ communication application can be provided on the various Windows® operating systems originating from Microsoft Corporation, the iOS and Mac OS operating systems originating from Apple Inc., the Android™ operating system originating from Google Inc., and the like. For purposes of convenience, such a collection of applications is sometimes called an "application family" associated with a communication service.

Thus, a counterpart application on another device need not be the same actual application. A counterpart application for a different platform can be used to establish communications. The technologies herein can distinguish the different versions and platforms to determine whether seamless call transitions are possible and then implement them accordingly.

The applications can serve as endpoints for the calls. Thus, a seamless transition can transition from one set of endpoints (e.g., phone call applications) to another set of endpoints (e.g., applications in an application family associated with a communication service).

EXAMPLE 8

Exemplary Auto-detection of Capabilities

Auto-detection of the other communication device's installed communication applications that support seamless call transitions can be implemented to determine if there is any intersection with applications at the local device. So, if both devices have an application in common that supports seamless call transitions to a call of the second call type, the shared application can be designated as the one to be used. If multiple applications are shared, user preferences can be consulted. In some cases, whether an application supports seamless transitions may depend on the platforms or version of the application.

It can thus be determined that the parties engaged in the first call both subscribe to the same service. An seamless upgrade to a call type supported by the service can then be accomplished.

EXAMPLE 9

Exemplary Implementation: Upgrade to Video Call

The technologies described herein can be implemented to upgrade a voice phone call to a video call. In such a case, the first call type is a phone call (e.g., audio with no video), and the second call type is a video call (e.g., typically video and audio via VoIP). Language and icons indicative of video can be used throughout the user interface to indicate that a call can be upgraded to video using the seamless call transition technologies described herein. Thus, the seamless transition upgrades from an audio call to a video call.

So, for example, when two parties are talking as part of a cellular call, they can upgrade the cellular call to a video call by seamlessly transitioning the call to a video call type.

Such an implementation can be accomplished with a system comprising an executable audio calling application and an executable video calling application. The call controller can be configured to seamlessly transition a call from the audio calling application to the video calling application.

EXAMPLE 10

Exemplary Implementation: Upgrade to VoIP

The technologies described herein can be implemented to upgrade a cellular phone call to a VoIP call. In such a case, the first call type is a cellular call (e.g., audio with no video), and the second call type is a VoIP call. Language and icons indicative of VoIP can be used throughout the user interface to indicate that a call can be upgraded to VoIP using the seamless call transition technologies described herein. Thus, the seamless transition upgrades from a cellular call to a VoIP call.

So, for example, when two parties are talking as part of a cellular call, they can upgrade the VoIP call to a video call by seamlessly transitioning the call to a VoIP call type.

Such an implementation can be accomplished with a system comprising an executable phone calling application and an executable VoIP calling application. The call controller can be configured to seamlessly transition a call from the phone calling application to the VoIP calling application.

EXAMPLE 11

Exemplary User Interface Option to Invoke Seamless Call Transition

In any of the examples herein, a user interface option can be presented by which seamless call transition can be invoked. As described herein, such an option can be presented conditionally, based on whether such a call transition is possible.

Figure 5:
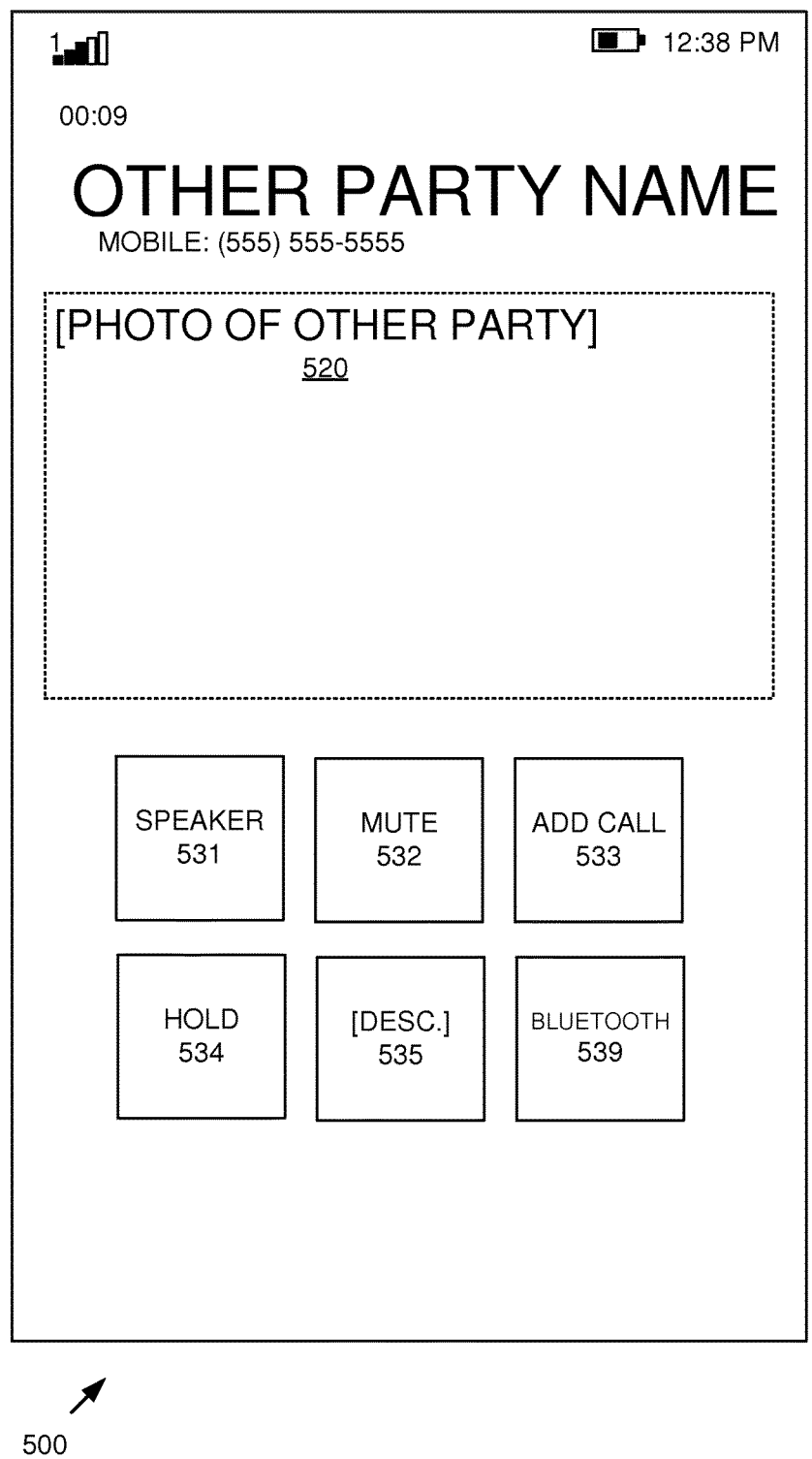
FIG. 5 is a wire frame of an exemplary call progress user interface implementing a seamless call transition.

FIG. 5 is a wire frame of an exemplary call progress user interface 500 and includes an activatable user interface element 535 for initiating the transition. In practice, the user interface element 535 can be depicted as disabled (e.g., greyed out, faded, or the like) when not available and enabled when available. For example, the user interface element can be depicted as disabled when network conditions do not support the second call type.

The user interface element 535 can incorporate a description, text, logo, graphic, or other information that indicates which application or call type (e.g. of the second call) is involved. For example, for transitions to a video call type, a video camera or similar icon can be shown.

In the example, the user interface element 535 is depicted as part of a call progress (e.g., ongoing call, in-call, or mid-call) user interface while conducting the first call. The user interface includes a photograph 520 of the other party, and various other user interface elements for controlling a current call (e.g., speaker button 531, mute button 532, add call button 533, hold button 534, and Bluetooth button 539). In practice, other or additional user interface elements can be shown.

In cases where seamless call transitions are not available because no applicable communication application is installed, a user interface element can still be presented. Thus, it can be determined that an application for supporting calls of the second type is not installed on the communication device, and an option as part of a call progress user interface can be presented to initiate an installation process for the application on the communication device.

Such a user interface element can call attention to the fact that an application supporting seamless call transitions could be installed (e.g., via an icon, graphics, text, color, or the like). Activation of the user interface element can lead to displaying a list of supported communication applications. Activation of an application in the list can result in navigation to a marketplace page where the application can be acquired. Or, activation of the user interface element can result in direct navigation to an app marketplace or marketplace page where an appropriate communication app can be purchased.

Although the user interface element 535 can be enabled upon determination that a call transition is possible, the determination need not be completely accurate. For example, it may be that the other party no longer subscribes to the relevant service, or that network conditions have since deteriorated.

An implementation can support multiple user interface elements 535 for transitioning. For example, different elements can be presented for different call types, different services, or different call features (e.g., video, screen sharing, or the like). Or, a single element 535 can support multiple call types (e.g., via tap and hold, learning user behavior, or the like).

If desired, a preference can be set so that transitions automatically take place when available.

EXAMPLE 12

Exemplary Activation

In any of the examples herein, a user interface element can take the form of a displayed or implied user interface element that can be activated by a user. Such elements can take the form of tiles, icons, graphical buttons, areas, items in a list, shapes, sliders, or the like, presented as part of a graphical user interface. The user interface element can include text, graphics, or color to indicate functionality.

An activation (e.g., of an activatable user interface element) can take the form of user input indicative of selection (e.g., of the activatable user interface element). For example, in systems supporting touch, a tap, hover, or other touch gesture can be received. Other systems can support clicking, hovering, voice activation, blinking, winking, and the like.

EXAMPLE 13

Exemplary Contact Points

In any of the examples herein, various number or address types can be supported (e.g., home, mobile, work, or the like). A contact point can take the form of a number or address associated with a contact. For example, a contact point can be a phone number or user address for a contact, such as a work number for a contact, a mobile number for a contact, or a home number for a contact.

When determining the identity of a party using the other communication device, the phone number of the other communication device can be used to search for a contact that has a matching contact point. The contact entry may then be used to find a number or user address for the communication application that is orchestrating the second call. For example, a phone number can be used to determine a user address for a VoIP call.

EXAMPLE 14

Exemplary Consent

In any of the examples herein, an opportunity can be given to consent to the call transition at the other communication device before the second call is activated or initiated. For example, when transitioning to a call type that supports video, the other party may not wish their device to send video.

A user interface can be displayed that obtains consent from a user. Information about the requesting party and type of call can be shown (e.g., "Ellen is requesting that the call now include video. OK?"). Responsive to receipt of consent, the transition can continue.

To obtain the attention of the user, a tone or other audio indication can be played when asking for consent.

If desired, consent can be implemented so that the call transition still takes place while respecting the user's intent. For example, the call can be upgraded to VoIP, but video from the non-consenting side is not included. Or, additional options can be presented to the user. For example, independent consent for upgrade and inclusion of video can be implemented.

In some cases, consent may not be supported, and the experience from the callee's side may not be that of a seamless transition on the callee's side (e.g., the incoming call appears as an incoming call).

EXAMPLE 15

Exemplary Method of Transitioning a Call

Figure 6:
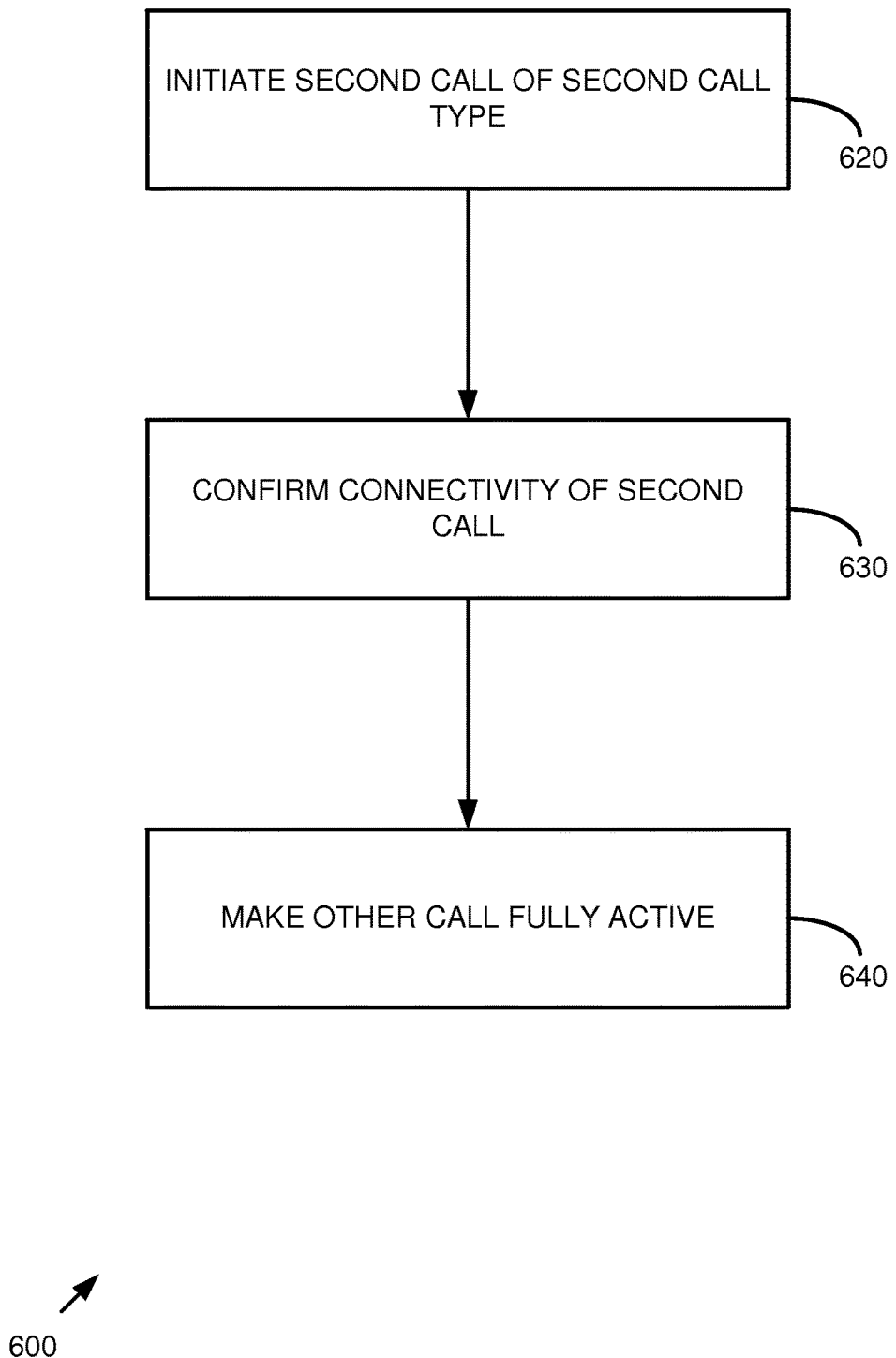
FIG. 6 is a flowchart of an exemplary method of transitioning a call.

FIG. 6 is a flowchart of an exemplary method 600 of transitioning a call and can be implemented, for example, in the system shown in FIG. 1. A system implementing the method can also include a unique identifier of the first call and audio suppression logic as described herein.

At 620, a second call of a second (e.g., different from the first) call type is initiated from the local communication device to the other communication device. The call can be placed in the background (e.g., is not presented to the user as a separate call). Meanwhile, the first (e.g., current) call is kept active. For example, if a second call typically results in the first call being placed on hold, such functionality can be inhibited. As described herein, the audio of the second call can be suppressed.

Although the second call can be placed in the background, some indication of progress can be provided without giving the impression that a second call has been made. For example, while waiting for connection, a marquee, animation, or other mechanism indicative of preparing for the transition can be shown. Also, the user interface element that initiated the transition can be disabled.

At 630, connectivity of the second call is confirmed. For example, it can be determined whether the second call was successfully established with the other communication device. Thus, the second call is established (e.g., over a second channel) while maintaining the first call. If for some reason connectivity is not successful (e.g., after n seconds), the process can fail, and the first call still continues.

At 640, responsive to confirming connectivity of the second call, the second call can be made fully active. In some implementations, the first call can then be placed on hold, terminated, dropped, or otherwise become inactive. To facilitate deactivation of the first call, a unique identifier can be used to identify the first call. To avoid undesirable or unauthorized deactivation of the first call, a simplistic unique identifier can be avoided. Instead, a more complex (e.g., GUID or the like) identifier generation scheme can be used to identify the call.

As part of the transition, audio resources can be switched to better facilitate the second call type. For example, if the second call type is video, the audio can be switched from device earpiece to speaker to facilitate use of the camera. If Bluetooth audio is being used, then the audio resources need not be switched.

As described, the method 600 can accomplish switching applications (e.g., switching between a call supported by one application type to a call supported by a different application type) while maintaining the impression that a single call is involved.

When transitioning to call types that include video, local video can be shown on the device (e.g., to give the user an opportunity to check appearance) during an interstitial period before the local video becomes visible to the other communication device. Audio from the first call can continue during the interstitial period.

On the callee's device, the seamless transition can be implemented in a similar manner. However, the incoming call can be denoted as a special call that is to be treated as part of seamless transition. So, instead of showing the incoming call as an incoming call, it can be handled in the background, and transition to the incoming call can then be accomplished seamlessly. Consent can be obtained as described herein.

In some cases, network conditions may deteriorate, prompting a transition back to the call type of the first call. Such a transition can be performed seamlessly as described herein. Consent of the other party may not be possible or required (e.g., when removing video from a call).

EXAMPLE 16

Exemplary Suppression of Audio

In any of the examples herein, audio for a second call can be suppressed before it is made active. Such a technique can avoid doubling of audio, echoing, and the like. Call suppression can be controlled by the call controller or other component.

EXAMPLE 17

Exemplary User Interface Sequence

In any of the examples herein, the user interface can sequence between the original user interface (e.g., a call progress UI) and the user interface of the communication application supporting the second call. Upon completion of the transition, it appears that the first call transformed into the second call. The functionality of the second call type is then presented for use at the communication device.

At the other device, a request for consent can be shown, after which the user interface transitions into that supporting the second call.

EXAMPLE 18

Exemplary Call Transition State

In any of the examples herein, a call transition state can be stored to help orchestrate the transition process. Such a state can be implemented in conjunction or as part of a call state. For example, the state can indicate "not implemented," "inactive," "initiating second call," "completed," or the like.

Similarly, as described herein, a network state indicator can be stored.

EXAMPLE 19

Exemplary Method of Registering a Communication Application

Figure 7:
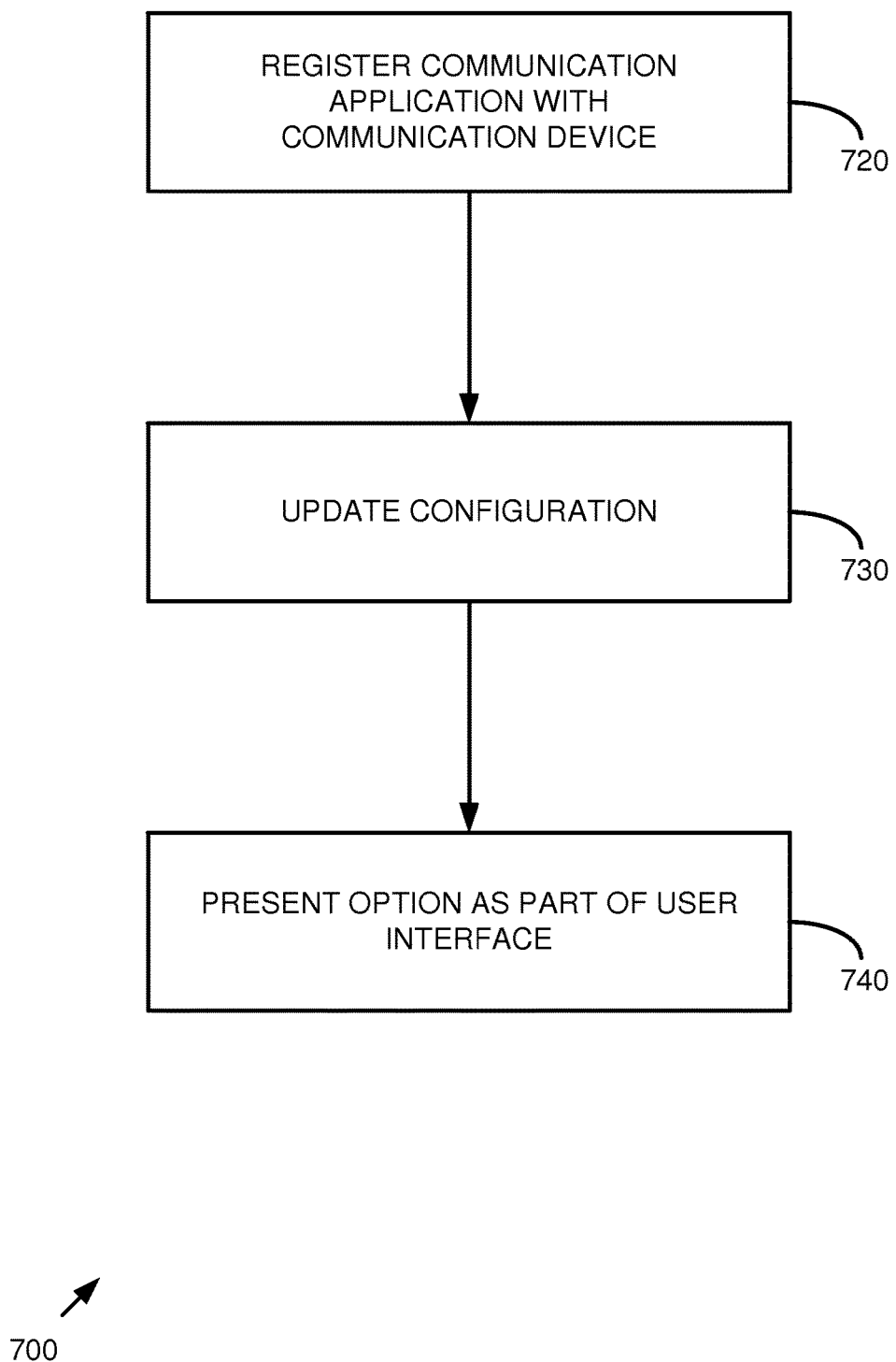
FIG. 7 is a flowchart of an exemplary method of registering a communication application to accomplish seamless call transitions.

FIG. 7 is a flowchart of an exemplary method 700 of registering a communication application to accomplish seamless call transitions and can be implemented, for example, in any of the communication devices described herein.

At 720, a communication application is registered with a communication device. For example, an operating system or other controlling software can receive a notification that a communication application is being installed, that it supports one or more call types, and that it supports seamless call transitions.

At 730, responsive to the registration, the configuration of the communication device is updated. For example, a list of communication applications that support a particular call type can be updated by adding the communication application to the list. A preferred communication application for a particular call type can also be stored.

At 740, as a result of the registration, an option for seamlessly transitioning to a second call of a type supported by the communication application is presented in a user interface of the communication device. As described herein, such an option can be presented conditionally or conditionally enabled (e.g., depending on capabilities of the other communication device, network conditions, and the like).

Thus, during installation of an application supporting a second call type, the application can be registered as to be used when conducting seamless transitions via the second call type. Subsequently, a user interface element indicating the second call type or the application can be presented responsive to the registering.

EXAMPLE 20

Registered Communication Applications

FIG. 8 is a block diagram of a table 800 storing a preferred communication application and can be stored as part of configuration data (e.g., transitions configuration data 130). The table 800 can store entries 830 that indicate an application 830A and whether the application is preferred 830B. The table can be built and updated when communication applications register. Then, the table can be consulted when determining whether or which application to show when presenting a user interface option for seamless call transitions. For example, if Application 3 is the preferred application, it can be indicated as the application invoked when the user interface option is activated (e.g., by text, graphics, logo, or the like).

Other information (e.g., text, icon, logo, or other graphic) can also be stored or referenced in the table and displayed as part of the user interface element (e.g., as part of a call progress UI). The table can explicitly indicate whether an application supports seamless transitions, or the table can be limited to such communications applications. A separate preference can be set for purposes of seamless transitions. So, if there are multiple applications that support a particular call type, a subset may support seamless transitions. If there are multiple applications in the subset, a particular one of the communication applications can be designated as preferred.

Although the example shows communication applications for a single call type, multiple call types can be supported. Different applications can be indicated as preferred for different call types.

EXAMPLE 21

Exemplary Configuration of Communication Applications

Figure 9:
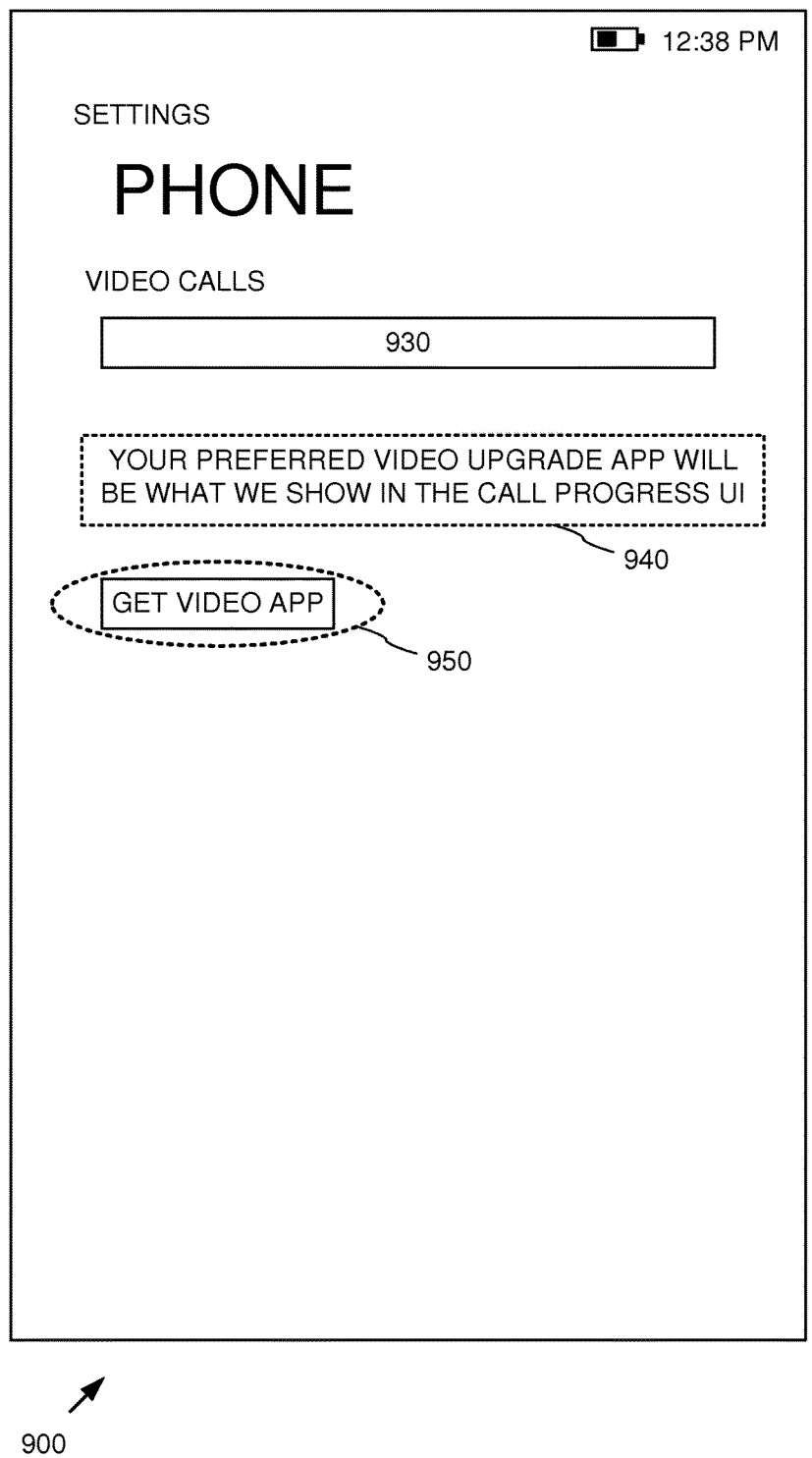
FIG. 9 is a wire frame of an exemplary settings user interface for choosing a preferred application for a call type.

FIG. 9 is a wire frame of an exemplary settings user interface 900 for choosing a preferred application for a call type. In the example, a user interface for selecting a preferred communication application for a particular type of call (e.g., video) is shown. User interfaces for other or additional call types can be supported.

The preferred application can be shown in box 930. If more than one communication application is available, the box 930 can be a drop down box that allows selection of a different application. Preferences as described herein can then be updated accordingly.

Explanatory text 940 can be shown to describe the result of choosing a particular application (e.g., that the selected application will be shown in the call progress UI). If no applications are installed, the interface can display text 940 indicating the results of obtaining a supporting communication application. For example, the text can describe the benefits of having video, the availability of seamless call transitions, etc. (e.g., "Did you know that you can upgrade a call to a video call with an upgrade app?").

The user interface 900 can display a user interface element 950 that allows navigation to an application marketplace where a supporting application can be obtained as described herein.

An alternative technique can allow an application to set itself as the preferred application for a particular call type. Applications need not have direct access to the settings. For example, during registration, an application can access an API (e.g., specifying the call type, an application identifier, or the like) to set itself as the preferred application. To prevent surreptitious changes to configuration, a dialog box can be displayed to confirm the change (e.g., "Make Application x your preferred video application? Yes/No"). An application can query the API to see if it is already preferred. If so, no change is required.

EXAMPLE 22

Exemplary Advantages

As described herein, users can easily take advantage of their device's capabilities without having to learn new processes or even initially be aware that such capabilities exist.

EXAMPLE 23

Exemplary Computing Systems

Figure 10:
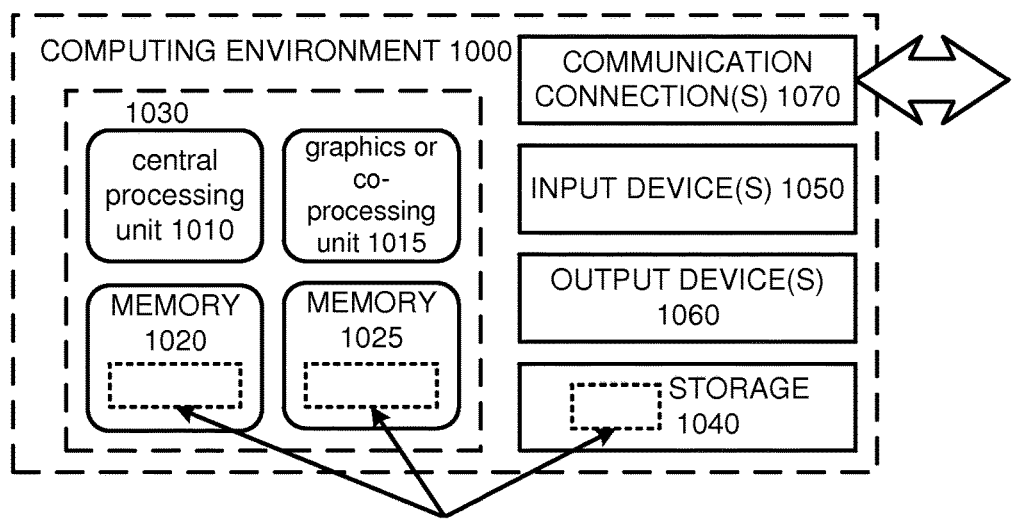
FIG. 10 is a diagram of an exemplary computing system in which some described embodiments can be implemented.

FIG. 10 illustrates a generalized example of a suitable computing system or environment 1000 in which several of the described innovations may be implemented. The computing system 1000 is not intended to suggest any limitation as to scope of use or functionality, as the innovations may be implemented in diverse general-purpose or special-purpose computing systems. A communication device as described herein can take the form of the described computing system 1000.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 1000, computer-readable media include memory 1020, 1025, storage 1040, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 24

Exemplary Mobile Device

Figure 11:
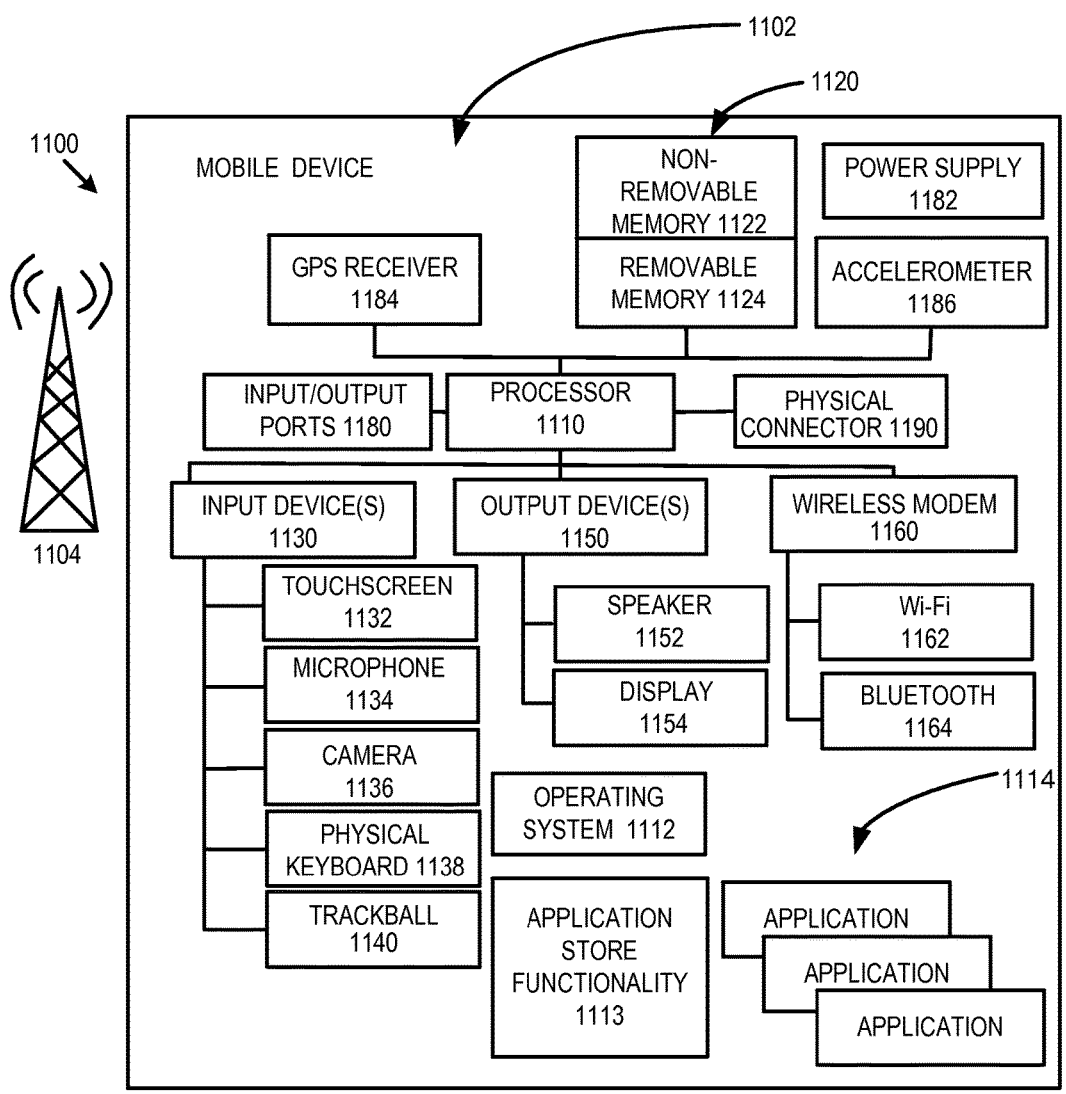
FIG. 11 is an exemplary mobile device that can be used for the technologies described herein.

In any of the examples herein, a communication device can take the form of a mobile device. FIG. 11 is a system diagram depicting an exemplary mobile device 1100 including a variety of optional hardware and software components, shown generally at 1102. Any components 1102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network. Voice over IP scenarios (e.g., over WiFi or other network) can also be supported. The communication devices described herein can take the form of the described mobile device 1100.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs 1114 can include common mobile computing applications (e.g., email applications, calendars, contact managers, web browsers, messaging applications), or any other computing application. Functionality 1113 for accessing an application store can also be used for acquiring and updating applications 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touch screen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM or CDMA network for data and voice communications within a single cellular network, between cellular networks, or between the mobile device and a public switched telephone network (PSTN).

The mobile device 1100 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

EXAMPLE 25

Exemplary Cloud-Supported Environment

Figure 12:
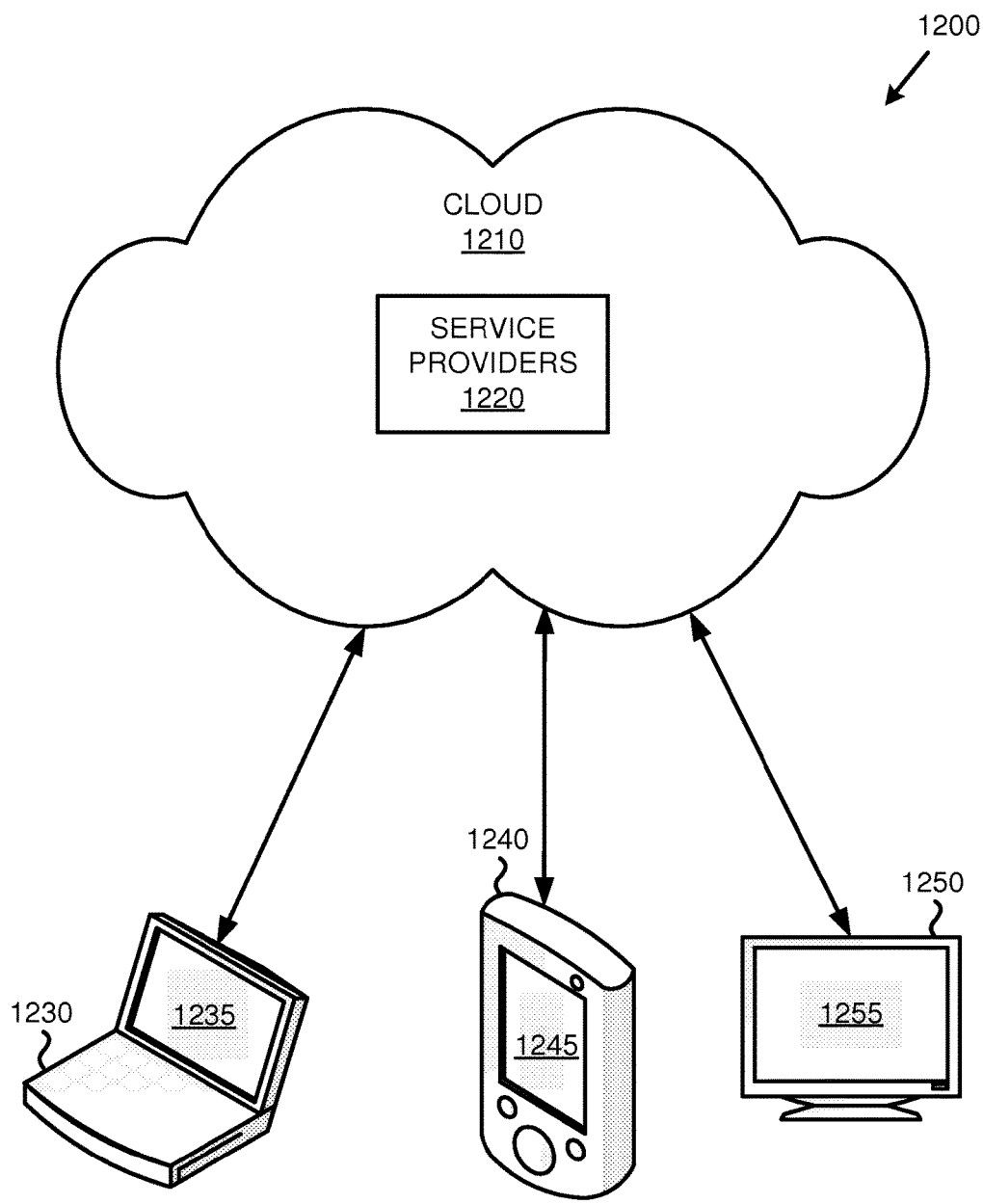
FIG. 12 is an exemplary cloud-support environment that can be used in conjunction with the technologies described herein.

In example environment 1200 of FIG. 12, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like. Connected device 1250 represents a device with a large screen 1255. For example, connected device 1250 could be a television screen (e.g., a smart television) or another device connected to a television (e.g., a set-top box or gaming console) or the like. One or more of the connected devices 1230, 1240, 1250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

EXAMPLE 26

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Exemplary Combinations

Various combinations can be supported. For example, the incoming call user interface can be combined with the call-in-progress user interface (e.g., after the incoming call is accepted). The call-in-progress user interface can be combined with the background call-in-progress user interface (e.g., if the call moves to the background).

The call-in-progress user interface can be combined with the home user interface (e.g., if navigation occurs to the home user interface during a call). In such a case, the background call-in-progress user interface can also be displayed.

The user interface for initiating communications can be combined with any of the other user interfaces as well.

Alternatives

The technologies from any example can be combined with the technologies described in any one or more of the other examples. Where the word "exemplary" is used, it is intended to indicate an example and not an ideal embodiment. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a communication device, the method comprising:
    while conducting a first call of a first call type with the communication device, wherein the first call is between the communication device and an other communication device, displaying a call progress user interface for the first call of the first call type and determining whether it is possible to seamlessly transition to a second call of a second call type, wherein determining whether it is possible to seamlessly transition comprises determining whether the other communication device supports calls of the second call type before requesting consent from the other communication device;
    before requesting consent from the other communication device, responsive to determining that it is possible to seamlessly transition to the second call of the second call type, presenting a user interface option at the communication device in the call progress user interface for the first call of the first call type to seamlessly transition to the second call of the second call type;
    depicting the user interface option as disabled in the call progress user interface for the first call of the first call type when it is determined not possible to seamlessly transition to the second call of the second call type; and
    responsive to activation of the user interface option, seamlessly transitioning, by the communication device, to the second call of the second call type;
    wherein a plurality of different communication applications provided by a plurality of different service providers supporting seamless transitions for a particular call type are installed on the communication device, a particular one of the different communication applications is designated as preferred for the particular call type, and the preferred communication application is invoked when the user interface option in the call progress user interface is activated to seamlessly transition to the particular call type; and
wherein:
the particular one of the communication applications comprises a third-party communication application; and
the method further comprises:
during a registration process for the third-party communication application, receiving, by an operating system or other controlling software, a notification that the third-party communication application is being installed, that it supports one or more call types, and that it supports seamless call transitions;
further during the registration process for the third-party communication application, updating a list of communication applications that support the particular call type, wherein the updating comprises adding the third-party communication application to the list; and
designating the third-party communication application out of the list of communication applications as the preferred communication application for the particular call type.

2. The method of claim 1 wherein presenting the user interface option to seamlessly transition comprises:
presenting a graphical button in the call progress user interface while conducting the first call.

3. The method of claim 2 wherein the graphical button indicates the second call type.

4. The method of claim 2 further comprising:
depicting the button as disabled when network conditions do not support the second call type.

5. The method of claim 2 further comprising:
while displaying the user interface option, indicating the particular one of the different communications applications designated as preferred for the particular call type by text, graphics, or logo.

6. The method of claim 1 wherein seamlessly transitioning to the second call of the second call type comprises:
un-suppressing audio of the second call; and dropping the first call.

7. The method of claim 1 wherein seamlessly transitioning to the second call of the second call type comprises:
initiating the second call of the second call type; suppressing audio of the second call; and
confirming connectivity of the second call of the second call type.

8. The method of claim 1 wherein: the first call type comprises audio with no video; and the second call type comprises audio with video;
whereby the seamlessly transitioning upgrades from an audio call to a video call.

9. The method of claim 1 wherein:
the first call type comprises a cellular phone call; and
the second call type comprises audio from a Voice over IP (VoIP) application; whereby the seamlessly transitioning upgrades from a cellular phone call to a VoIP call.

10. The method of claim 1 further comprising:
determining that a communication application for supporting calls of the second call type is not installed on the communication device; and presenting an option as part of the call progress user interface to initiate an installation process for the communication application on the communication device.

11. The method of claim 1 further comprising: simultaneously maintaining two calls with another, same communication device before seamlessly transitioning.

12. The method of claim 1 wherein determining whether it is possible to seamlessly transition to a second call of a second call type comprises:
determining whether a network connectivity condition indicator indicates that the second call type is possible.

13. The method of claim 1 wherein:
determining whether the other communication device supports calls of the second call type comprises:
querying the other communication device.

14. The method of claim 1 wherein:
determining whether the other communication device supports calls of the second call type comprises:
querying local information about the other communication device.

15. The method of claim 1 wherein: determining whether the other communication device supports calls of the second call type comprises:
querying a server associated with a communication application about the other communication device.

16. A communication device comprising:
one or more processors;
memory storing an executable audio calling application, an executable video calling application, and application registration information indicative of whether the executable video calling application supports seamless transitions from an audio call to a video call; and
a call controller configured to seamlessly transition a call between the communication device and an other communication device from the executable audio calling application to the executable video calling application;
wherein the call controller is configured to determine whether it is possible to seamlessly transition from an audio call to a video call, wherein determining whether it is possible to seamlessly transition comprises checking the application registration information indicative of whether the executable video calling application supports seamless transitions, determining whether the other communication device supports video calls, and confirming whether a video calling application is available at the communication device; and
the call controller is configured to enable a user interface option in a call progress user interface for the audio call to seamlessly transition from the audio call to the video call responsive to determining that it is possible to seamlessly transition from the audio call to the video call, and the user interface option is disabled when determined that it is not possible to seamlessly transition from the audio call to the video call;
wherein a plurality of different applications supporting seamless transitions are installed on the communication device, a particular one of the different applications is designated as preferred, and the preferred application is invoked to seamlessly transition, by the communication device, from the audio call to the video call, when the user interface option in the call progress user interface is activated;
wherein the communication device is configured to implement a registration process for the preferred application, and the registration process comprises:

receiving, by an operating system or other controlling software, a notification that the preferred application is being installed, that it supports one or more call types, and that it supports seamless call transitions;

updating a list of communication applications that support video calls, wherein the updating comprises adding the preferred application to the list; and designating the preferred application out of the plurality of different applications as the preferred communication application for video calls.

17. The communication device of claim 16 wherein: the memory further stores a globally unique identifier for the call.

18. The communication device of claim 16 wherein: the call controller is further configured to control audio suppression of a video call during seamless transition.

19. One or more computer-readable storage media comprising one or more optical media discs, one or more volatile memory components, or one or more nonvolatile memory components, having encoded thereon computer-executable instructions causing a computing system to perform a method comprising:

at a local communication device, registering a communication application supporting seamless transitions to a video call as to be used when conducting seamless transitions to a video call, wherein a plurality of applications supporting seamless transitions are installed on the local communication device, and the applications serve as endpoints for the video call;

during an audio call with a remote device, determining whether network conditions support a video call, confirming that a communication application supporting seamless transitions to a video call is registered at a local communication device, and verifying that the remote device supports a video call from a video calling application;

responsive to determining that network conditions will support the video call, that a communication application supporting seamless transitions to a video call is registered at the local communication device, and that the remote device supports video calling with a video calling application, presenting an option in a call progress user interface to initiate seamless transition of the audio call to the video call, wherein the option is presented conditionally as part of the call progress user interface, based on whether it is determined that seamless transition of the audio call to the video call is possible;

responsive to activation of the option in the call progress user interface, initiating the video call with the remote device via the registered communication application, wherein the video call comprises video and audio;

suppressing the audio for the video call;

responsive to verifying connectivity of the video call, seamlessly transitioning the audio call to the video call by the local communication device, wherein seamlessly transitioning comprises:

i) unsuppressing the audio of the video call;
ii) displaying the video of the video call; and
iii) dropping the audio call;

wherein registering the communication application comprises:

receiving, by an operating system or other controlling software, a notification that the communication application is being installed, that it supports one or more call types, and that it supports seamless call transitions;

updating a table of communication applications that support video calls, wherein the updating comprises adding the communication application to the table; and designating the communication application out of the plurality of applications supporting seamless transitions as a preferred communication application for seamless transitions to a video call.

* * * * *